(12) United States Patent
Kumar et al.

(10) Patent No.: US 11,409,935 B2
(45) Date of Patent: Aug. 9, 2022

(54) PIN MUST-CONNECTS FOR IMPROVED PERFORMANCE

(71) Applicant: Intel Corporation, Santa Clara, CA (US)

(72) Inventors: Ranjith Kumar, Beaverton, OR (US); Srinivasa Chaitanya Gadigatla, Hillsboro, OR (US); Tamanna Husain, El Dorado Hills, CA (US); Abhinand Ramakrishnan, Folsom, CA (US); James Graeber, Folsom, CA (US); Kohinoor Basu, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 150 days.

(21) Appl. No.: 16/649,800

(22) PCT Filed: Dec. 27, 2017

(86) PCT No.: PCT/US2017/068471
§ 371 (c)(1),
(2) Date: Mar. 23, 2020

(87) PCT Pub. No.: WO2019/132870
PCT Pub. Date: Jul. 4, 2019

(65) Prior Publication Data
US 2020/0311332 A1    Oct. 1, 2020

(51) Int. Cl.
*G06F 30/39* (2020.01)
*G06F 30/392* (2020.01)
(Continued)

(52) U.S. Cl.
CPC .......... *G06F 30/392* (2020.01); *G06F 30/394* (2020.01); *H01L 27/0207* (2013.01); *G06F 2111/20* (2020.01); *G06F 2119/12* (2020.01)

(58) Field of Classification Search
CPC .. G06F 30/392; G06F 30/394; G06F 2111/20; G06F 2119/12; H01L 27/0207; H01L 2027/11881; H01L 27/11807
(Continued)

(56) References Cited

U.S. PATENT DOCUMENTS 8,941,150 B2    1/2015    Sherlekar et al.
9,035,679 B2    5/2015    Yuan et al.
(Continued)

OTHER PUBLICATIONS

International Preliminary Report on Patentability for International Patent Application No. PCT/US2017/068471 dated Jul. 9, 2020, 7 pgs.
(Continued)

*Primary Examiner* — Paul Dinh
(74) *Attorney, Agent, or Firm* — Schwabe, Williamson & Wyatt, P.C.

(57) ABSTRACT

An integrated circuit structure includes a first metal level comprising a first plurality of interconnect lines along a first direction. A cell is on at least the first metal level, the cell having a pin comprising more than two of the first plurality of interconnect lines. A second metal level comprising a second plurality of interconnect lines overlays the first metal level, where the second plurality of interconnect lines is along a second direction. Two or more vias are on at least one of the second plurality of interconnect lines to connect to the pin.

11 Claims, 11 Drawing Sheets

(51) Int. Cl.
  *G06F 30/394* (2020.01)
  *H01L 27/02* (2006.01)
  *G06F 111/20* (2020.01)
  *G06F 119/12* (2020.01)

(58) Field of Classification Search
  USPC .......................................................... 716/110
  See application file for complete search history.

(56) References Cited

U.S. PATENT DOCUMENTS

| | | |
|---|---|---|
| 2001/0054720 A1 | 12/2001 | Brunolli et al. |
| 2012/0241986 A1 | 9/2012 | Sherlekar |
| 2013/0334613 A1 | 12/2013 | Moroz |
| 2015/0200159 A1 | 7/2015 | Chen et al. |
| 2017/0032074 A1 | 2/2017 | Song et al. |
| 2017/0083654 A1* | 3/2017 | Chuang ................. G06F 30/392 |
| 2017/0345809 A1 | 11/2017 | Chang |
| 2017/0352649 A1 | 12/2017 | Pant |
| 2018/0294226 A1* | 10/2018 | Lee ..................... H01L 27/0207 |
| 2019/0155983 A1* | 5/2019 | Chen ..................... G06F 30/394 |
| 2019/0155984 A1* | 5/2019 | Chen ..................... G06F 30/398 |

OTHER PUBLICATIONS

Search Report from European Patent Application No. 17936240.5, dated Jul. 28, 2021, 8 pgs.

International Search Report and Written Opinion for International Patent Application No. PCT/US2017/068471 dated Sep. 21, 2018, 10 pgs.

Madhur Jagota et al, "Achieving "Sustainable" Performance (W/Ghz) on ARM Core Using Advanced Methodologies & Cadence Tools", Media Tek Inc., Sep. 12, 2017, 20 pgs.

* cited by examiner

Var. 1

Var. 2

Var. 3

Var. 4

Var. 5

Var. 6

Var. 7

Var. 8

PIN MUST-CONNECTS FOR IMPROVED PERFORMANCE

CROSS-REFERENCE TO RELATED APPLICATION

This patent application is a U.S. National Phase Application under 35 U.S.C. § 371 of International Application No. PCT/US2017/068471, filed Dec. 27, 2017, entitled "PIN MUST-CONNECTS FOR IMPROVED PERFORMANCE," which designates the United States of America, the entire disclosure of which is hereby incorporated by reference in its entirety and for all purposes.

TECHNICAL FIELD

Embodiments of the disclosure are in the field of integrated circuit structures and, in particular, pin must-connects for improved performance.

BACKGROUND

For the past several decades, the scaling of features in integrated circuits has been a driving force behind an ever-growing semiconductor industry. Scaling to smaller and smaller features enables increased densities of functional units on the limited real estate of semiconductor chips. For example, shrinking transistor size allows for the incorporation of an increased number of memory or logic devices on a chip, lending to the fabrication of products with increased capacity. The drive for ever-more capacity, however, is not without issue. The necessity to optimize the performance of each device becomes increasingly significant. Scaling multi-gate transistors has not been without consequence, however. As the dimensions of these fundamental building blocks of microelectronic circuitry are reduced and as the sheer number of fundamental building blocks fabricated in a given region is increased, the constraints on the semiconductor processes used to fabricate these building blocks have become overwhelming.

Variability in conventional and state-of-the-art fabrication processes may limit the possibility to further extend them into the, e.g. 10 nm or sub-10 nm range. Consequently, fabrication of the functional components needed for future technology nodes may require the introduction of new methodologies or the integration of new technologies in current fabrication processes or in place of current fabrication processes. New layouts may be introduced either to accommodate or to enable such future technology nodes.

DESCRIPTION OF THE EMBODIMENTS

Figure 1A:
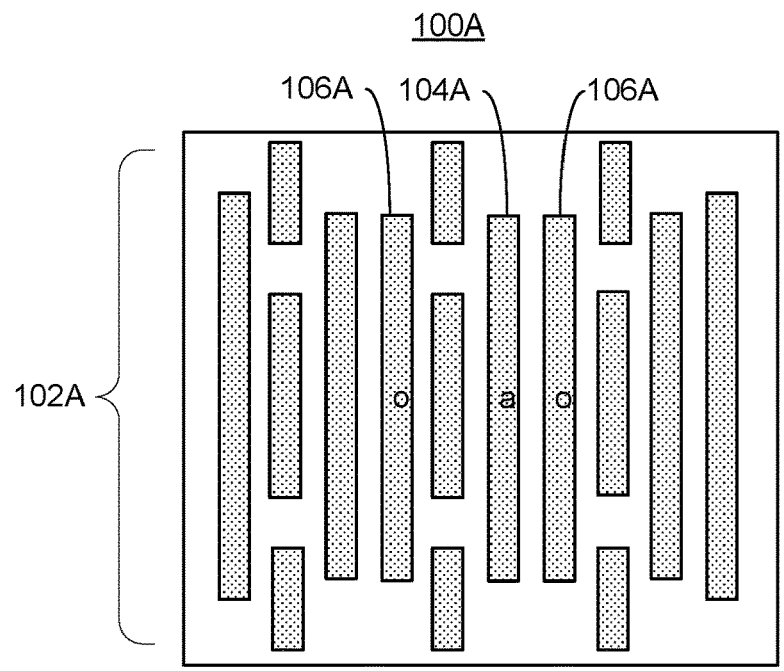
FIGS. 1A-1C are views illustrating a physical implementations of example metal 1 level structures for various cell layouts.

Pin must-connects for cells of integrated circuits are described for improved performance. In the following description, numerous specific details are set forth, such as specific material and tooling regimes, in order to provide a thorough understanding of embodiments of the present disclosure. It will be apparent to one skilled in the art that embodiments of the present disclosure may be practiced without these specific details. In other instances, well-known features, such as single or dual damascene processing, are not described in detail in order to not unnecessarily obscure embodiments of the present disclosure. Furthermore, it is to be understood that the various embodiments shown in the Figures are illustrative representations and are not necessarily drawn to scale. In some cases, various operations will be described as multiple discrete operations, in turn, in a manner that is most helpful in understanding the present disclosure, however, the order of description should not be construed to imply that these operations are necessarily order dependent. In particular, these operations need not be performed in the order of presentation.

Certain terminology may also be used in the following description for the purpose of reference only, and thus are not intended to be limiting. For example, terms such as "upper", "lower", "above", "below," "bottom," and "top" refer to directions in the drawings to which reference is made. Terms such as "front", "back", "rear", and "side" describe the orientation and/or location of portions of the component within a consistent but arbitrary frame of reference which is made clear by reference to the text and the associated drawings describing the component under discussion. Such terminology may include the words specifically mentioned above, derivatives thereof, and words of similar import.

Embodiments described herein may be directed to front-end-of-line (FEOL) semiconductor processing and structures. FEOL is the first portion of integrated circuit (IC) fabrication where the individual devices (e.g., transistors, capacitors, resistors, etc.) are patterned in the semiconductor substrate or layer. FEOL generally covers everything up to (but not including) the deposition of metal interconnect layers. Following the last FEOL operation, the result is typically a wafer with isolated transistors (e.g., without any wires).

Embodiments described below may be applicable to FEOL processing and structures, BEOL processing and structures, or both FEOL and BEOL processing and structures. In particular, although an exemplary processing scheme may be illustrated using a FEOL processing scenario, such approaches may also be applicable to BEOL processing. Likewise, although an exemplary processing scheme may be illustrated using a BEOL processing scenario, such approaches may also be applicable to FEOL processing.

One or more embodiments described herein are directed to pin must-connects for cells of an integrated circuit, in which library cell designs require that multiple vias are dropped on individual interconnect lines comprising an input or output pin. Embodiments may be directed to 10 nanometer or smaller technology nodes. Embodiments may include or be directed to cell layouts that make possible higher performance cells in a smaller footprint relative to a previous technology node.

A standard cell is a logic module that implements a simple function and has a predesigned internal layout. A cell library is provided that defines cells available for use in physical implementations using a particular technology node and specifies characteristics of those cells. The cell library typically includes standard cell layouts of different sizes. As used herein, the terms "small" and "large" cells are not defined by cell area, rather the terms are defined by the amount of current drive the cell can produce, which is dependent on different cell types. For example, a NAND gate can be implemented with 2 fins or 20 fins and perform the same function, but the more fins the cell has, the more current the cell can produce.

In integrated circuit designs, standard cells are placed over a substrate as building blocks for a circuit being implemented on various layers or levels such as, for example, metal 0 (M0), metal 1 (M1), metal 2 (M2), metal 3 (M3), and so on. In one embodiment, cells are described herein that exist on M0 and M1 as an example. However, in other embodiments, the cells may exist on any of the metal levels.

Figure 1B:
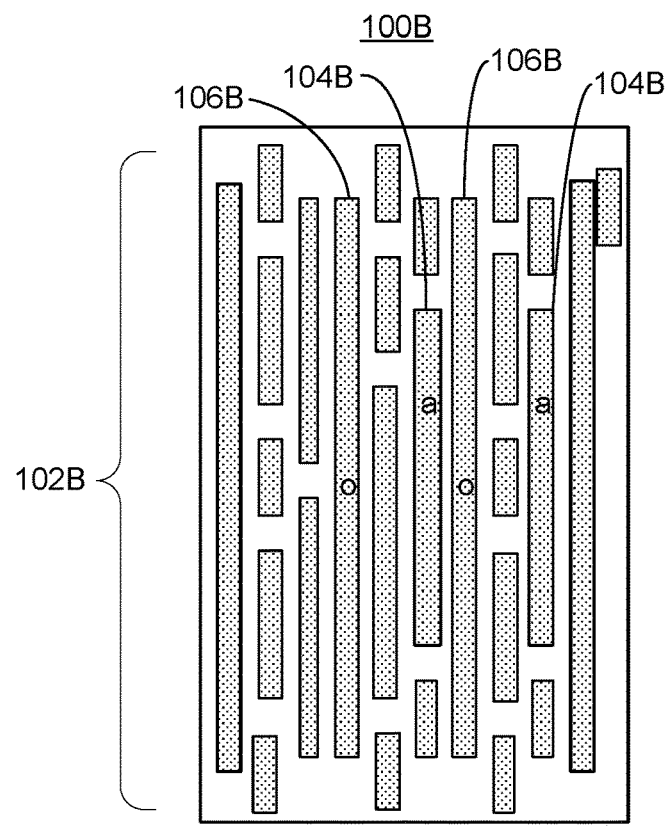
Figure 1C:
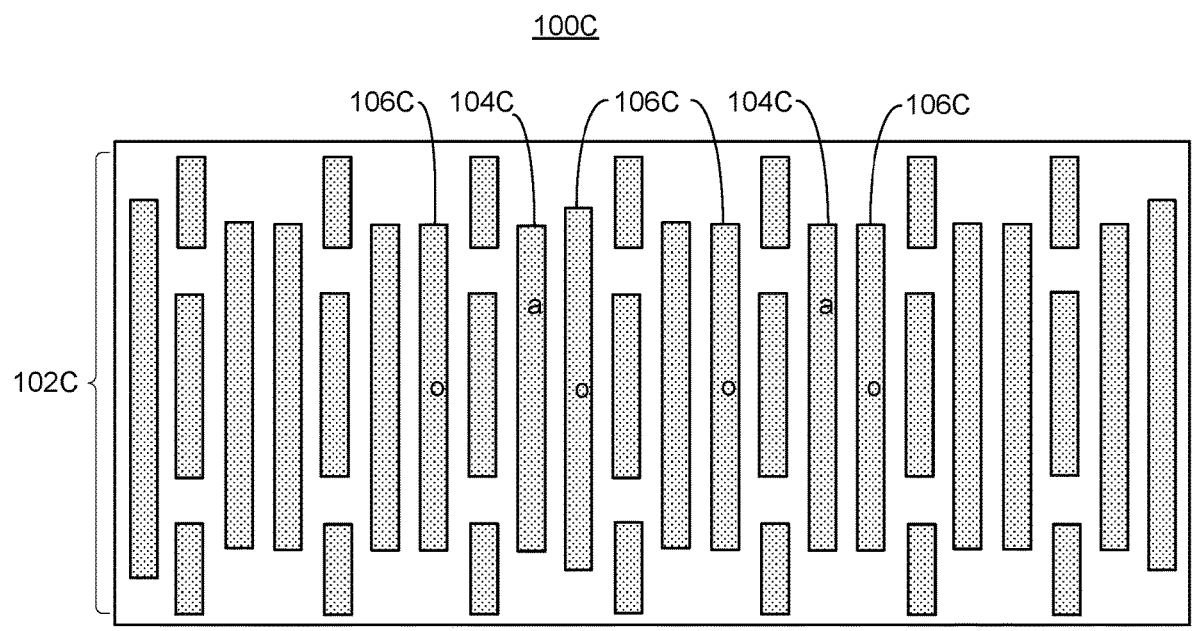

For context, FIGS. 1A-1C are views illustrating a physical implementations of example M1 level structures for various cell layouts. FIGS. 1A and 1B illustrates the structure of small cells 100A and 100B, while FIG. 1C illustrates the structure of a large cell 100C, where each of the cells respectively comprise a plurality of substantially parallel interconnect lines 102A 102B 102C along a first direction. The interconnect lines 102A 102B 102C may be also referred to as tracks or segments. One or more of the interconnect lines 102A 102B 102C may be used as respective input pins and/or output pins.

For example, referring to FIG. 1A, the cell 100A includes an input pin 104A comprising one M1 interconnect line designated as (a), and an output pin 106A comprising two M1 interconnect lines designated as (o). Other portions of the interconnect lines 102A may comprise power segments and signals segments. Referring to FIG. 1B, the cell 100B includes an input pin 104B comprising two M1 interconnect lines, and an output pin 106B comprising a different two M1 interconnect lines. Referring to FIG. 1C, the cell 100C includes an input pin 104C comprising two M1 interconnect lines, and an output pin 106C comprising four interconnect lines. Accordingly, the cell 100C includes more interconnect lines dedicated to the input pins (a) and output pins (o) than the cells 100A and 100B of FIGS. 1A and 1B, respectively. Cell 100C may be referred to as a large cell, while cell 100A and 100B may be referred to as small cells. Cells 100A 100B and 100C are collectively referred to as cell(s) 100, and the interconnect lines 102A 102B 102C are collectively referred to as interconnect lines 102.

The automatic placement and routing of cells to form blocks is an important aspect of modern very large-scale integration (VLSI) devices. During placement, a placement tool accesses the cell layouts from a cell library and places the cells in rows. A router tool then creates connections between the cells at a block level by routing in available metal layers. A collection of cells may form a block. Typically, blocks are designed to use as few routing layers as possible so that higher level routing can be performed over the top of the block for inter-block routing. Typically, poly/M0/M1 is used for cell level routing. Upper layers above M1 and higher levels, e.g., M6 or so, are for block routing, and M6 to an upper most layer is for inter-block routing. Using M6 as the block-to-inter-block boundary can change for each foundry/technology.

The input pins (a) and output pins (o) of different cells 100 are typically connected to a next metal layer, e.g., M2, using vias (vertical interconnect access). As used herein, via is a small opening through one or more adjacent levels to provide a conductive connection. Vias are located on a via level (e.g., a via 1 level between M1 and M2) to connect the pins of the cell 102 on M1 to M2 interconnect lines, as shown in FIG. 2.

Figure 2:
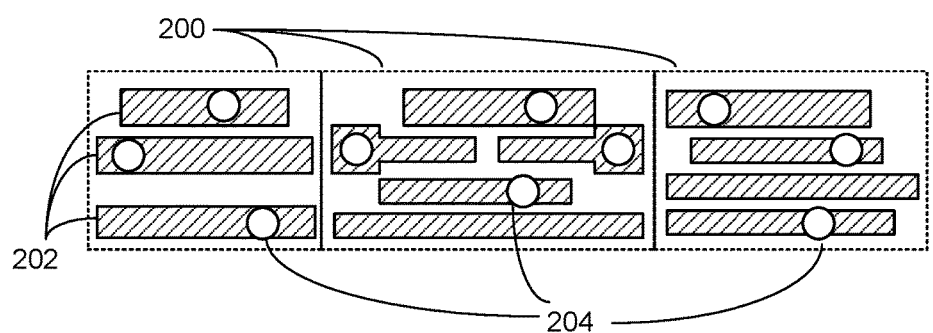
FIG. 2 is a plan view of a physical implementation of example cells at a M2 level according to a previous technology node.

FIG. 2 is a plan view of a physical implementation of example cells 200 at a M2 level according to a previous technology node. An underlying M1 level is not shown. M2 interconnect lines 202 are shown generally parallel and running in a direction orthogonal to the M1 interconnect lines. The example cells 200 on the M1 level comprise primarily input and output pins, which are hidden underneath the M2 interconnect lines 202. The M2 interconnect lines 202 that span over underlying pins on M1 are referred to as input nets. In the previous technology node, each pin on M1 is connected only once at the block level to the nets comprising the M2 interconnect lines 202 by virtue of a single via 204. Stated differently, the previous technology node provides one via 204 per individual M2 interconnect line 202 or net to connect to the underlying pins on M1. As an example, the vias 204 may be located at a via 1 level between the pins on M1 and the nets comprising the M2 interconnect lines 202 assuming the cells 200 end at M1.

According to one aspect of the disclosure, applicants recognize that the drawback of previous technology nodes, which connect each pin of a standard cell only once at the block level, is that the number of vias dropped for the pins makes a difference in cell performance. Using one via 204 to connect to one pin 202 results in less cell performance than using more than one via 204 to connect to a corresponding pin.

Accordingly, one or more embodiments described herein are directed to a concept of "pin must-connects", where library cells are required to include a pin must-connect level specifying that each instance of a cell having a pin comprising multiple (i.e., three or more) interconnect lines include more than two vias on a single net corresponding to the pin.

Figure 3A:
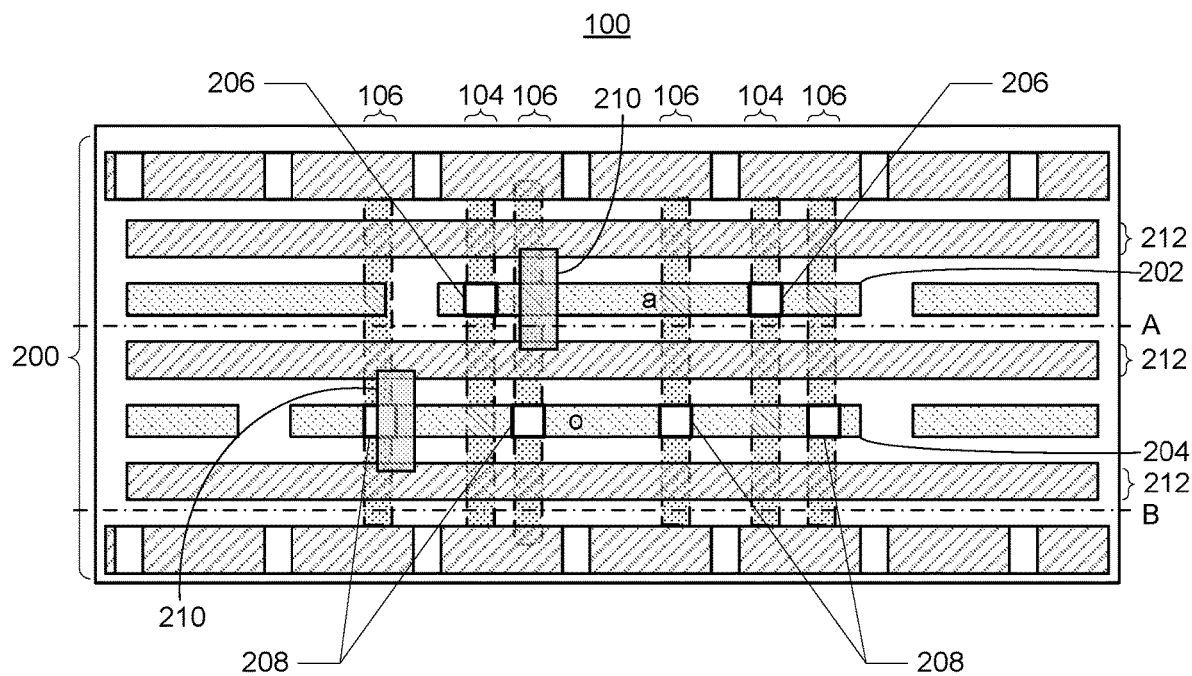
FIG. 3A is a M2 level plan view of a physical implementation of an example cell having a pin must-connects level in accordance with an embodiment of the present disclosure.

FIG. 3A is a M2 level plan view of a physical implementation of an example cell having a pin must-connects level in accordance with an embodiment of the present disclosure. The example shows the M2 structure of the cell layout, which corresponds to the M1 structure of the cell 100C of FIG. 1C (shown with dotted lines). The cell 100 on the M1 level includes input pin 104 comprising two M1 interconnect lines, and an output pin 106 comprising four M1 interconnect lines, where the M1 interconnect lines are substantially parallel and run along a vertical direction in this example.

The M2 level comprises a plurality of M2 interconnect lines 200 overlaying the M1 level. The plurality of M2 interconnect lines 200 are substantially parallel and run along a direction generally orthogonal (e.g., within +−5 degrees) to the direction of the M1 interconnect lines.

One of the M2 interconnect lines serves a single input net 202 (designated as a) that spans across the M1 interconnect lines comprising the input pin 104, while another of the M2 interconnect lines serves as a single output net 204 (designated as o) spans across the underlying M1 interconnect lines comprising the output pin 106.

FIG. 3A also shows two M3 level interconnect lines 210 along the first direction over the M2 level to respectively connect the input net 202 and the output net 204 to adjacent M2 signal interconnect lines 212.

Figure 3B:
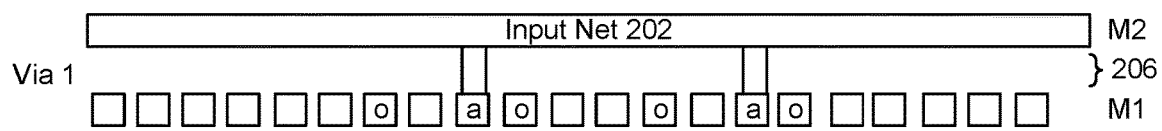
FIG. 3B is a cross-sectional view of the cell in FIG. 3A along line A.
Figure 3C:
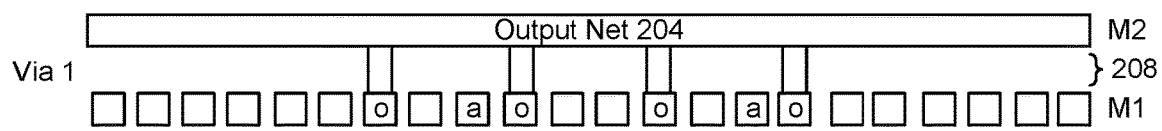
FIG. 3C is a cross-sectional view of the cell in FIG. 3A along line B.

FIG. 3B is a cross-sectional view of the cell 100 in FIG. 3A along line A, and FIG. 3C is a cross-sectional view of the cell 100 in FIG. 3A along line B. FIG. 3B shows the input pin (a) via 206 connections between M1 and the input net 202. FIG. 3C shows the output pin (o) via 208 connections between M1 and the output net 204. In this embodiment, the pin must-connects level resides at via 1 between M1 and M2. Rather than dropping one via per pin, the pin must-connects level specifies that any pin comprising more than two interconnect lines must have a set of two or more or multiple vias on a single net that connects to the pin.

In the example of FIGS. 3A-3C, the number of vias dropped on the input and output pins is maximized to match the number of interconnect lines comprising the pins. As shown, the input net 202 has two input vias 206 that connect to the two M1 interconnect lines comprising input pin 104, and the output net 204 includes four output vias 208 to connect to the four M1 interconnect lines comprising the output pin 106.

The following describes the performance increase provided by the concept of must-connects. The cell 100 shown in FIG. 3A having pin must-connects can be used as a reference cell and compared to variant cells having generally the same structure as the reference cell 100, but with different pin connections in order to examine cell performance.

FIGS. 4A-4H illustrate physical implementations of variant cells of the reference cell showing different combinations of pin connections. In one embodiment, based on library cell layouts, the router at the block level can optionally place a multiple number of vias and may use any of the M2 interconnect lines to use as nets on which the vias to place the vias to connect to the pins.

Figure 4A:
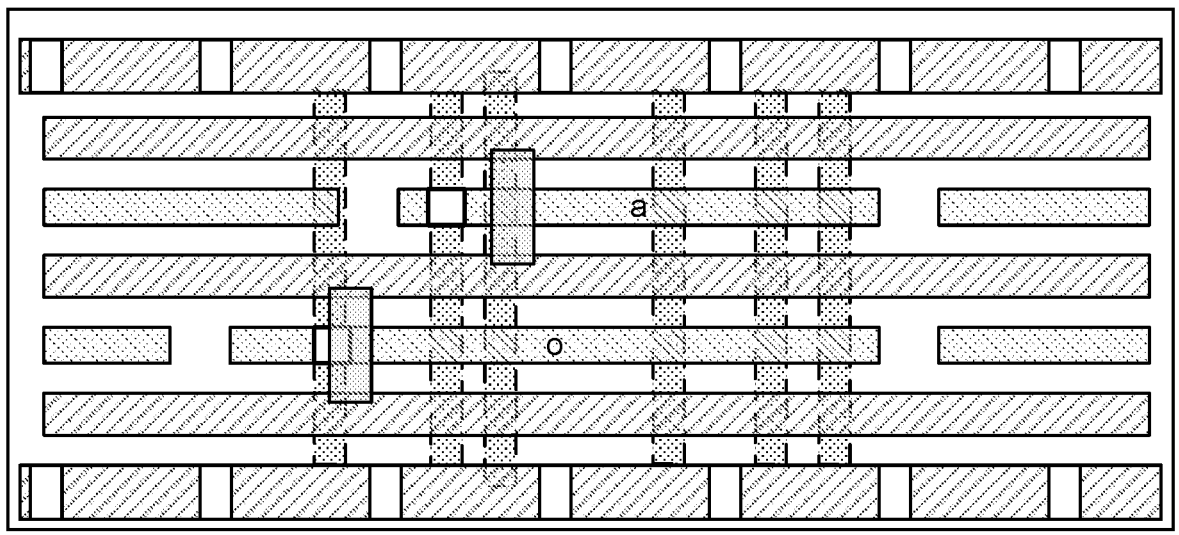
FIGS. 4A-4H illustrate physical implementations of variant cells of the reference cell showing different combinations of pin connections.
Figure 4B:
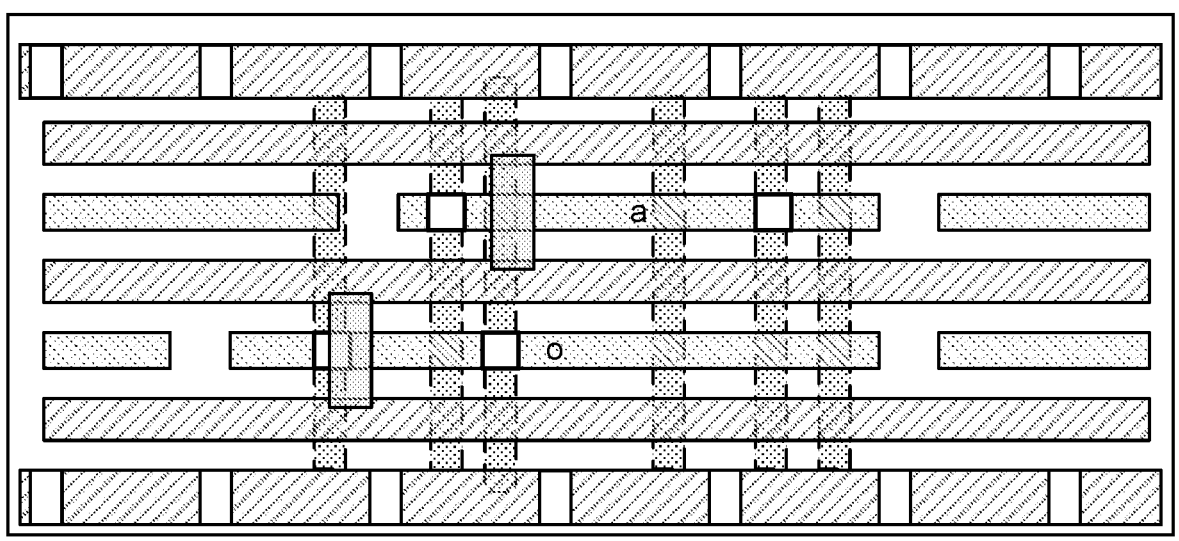
Figure 4C:
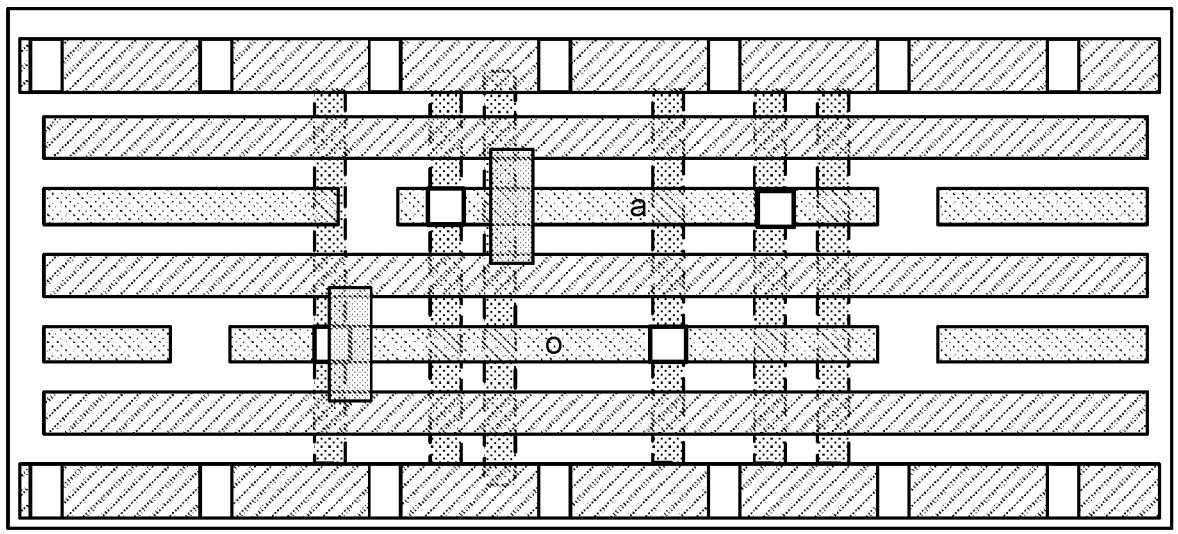
Figure 4D:
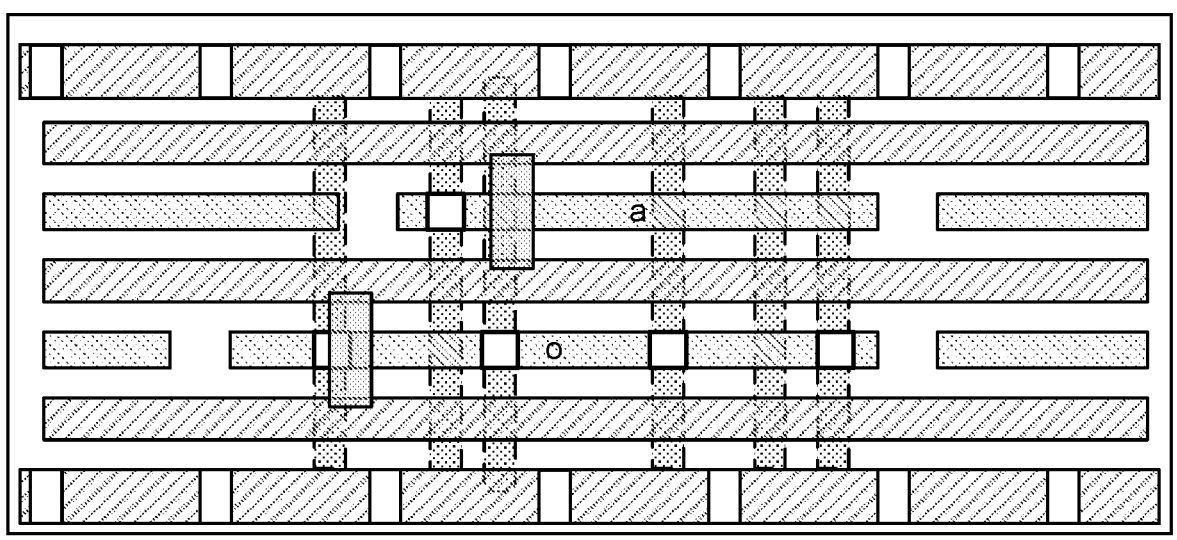
Figure 4E:
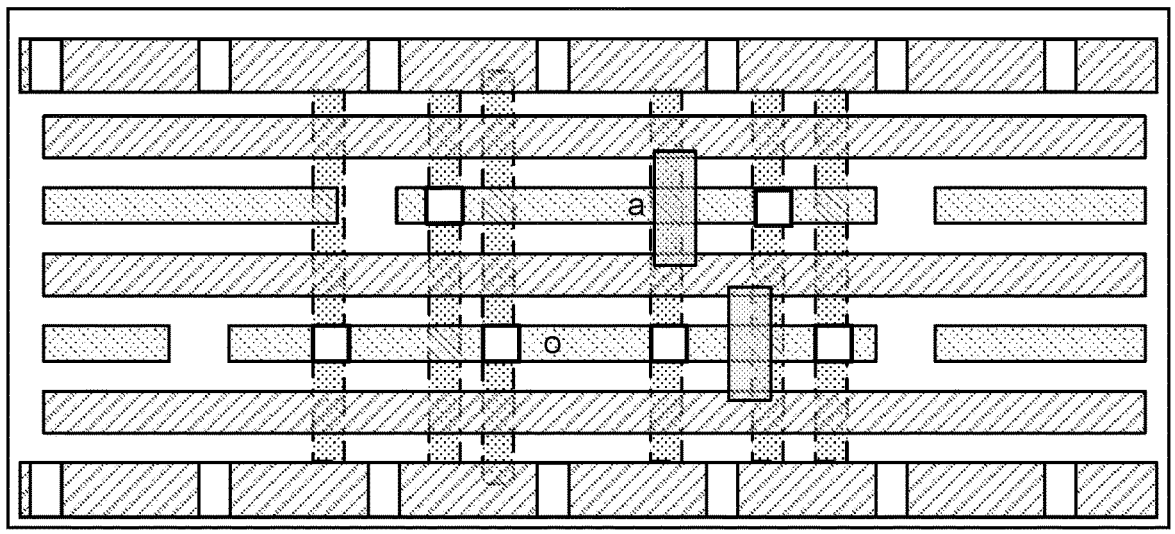
Figure 4F:
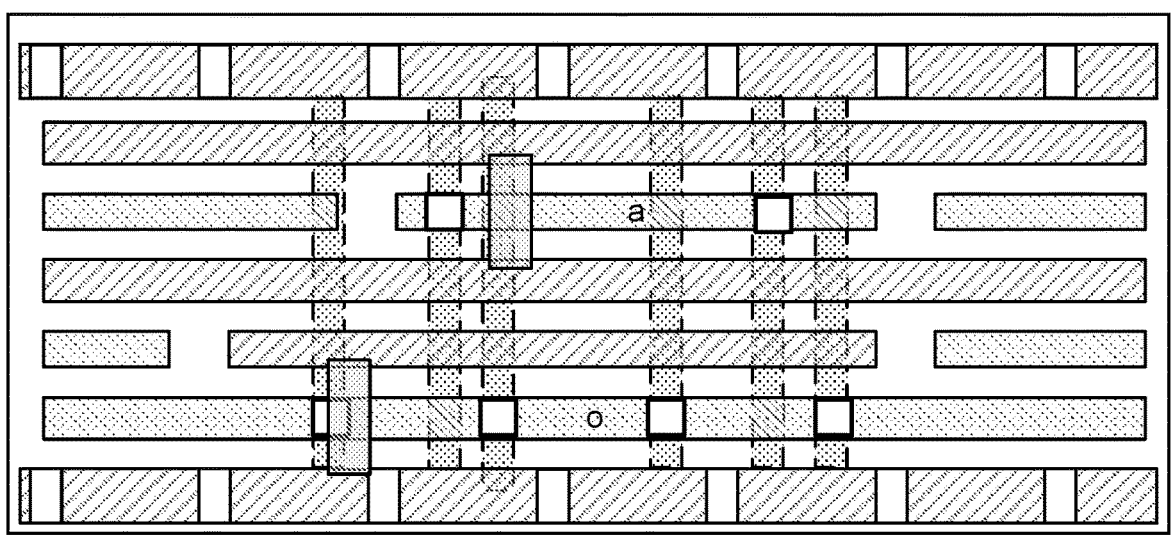
Figure 4G:
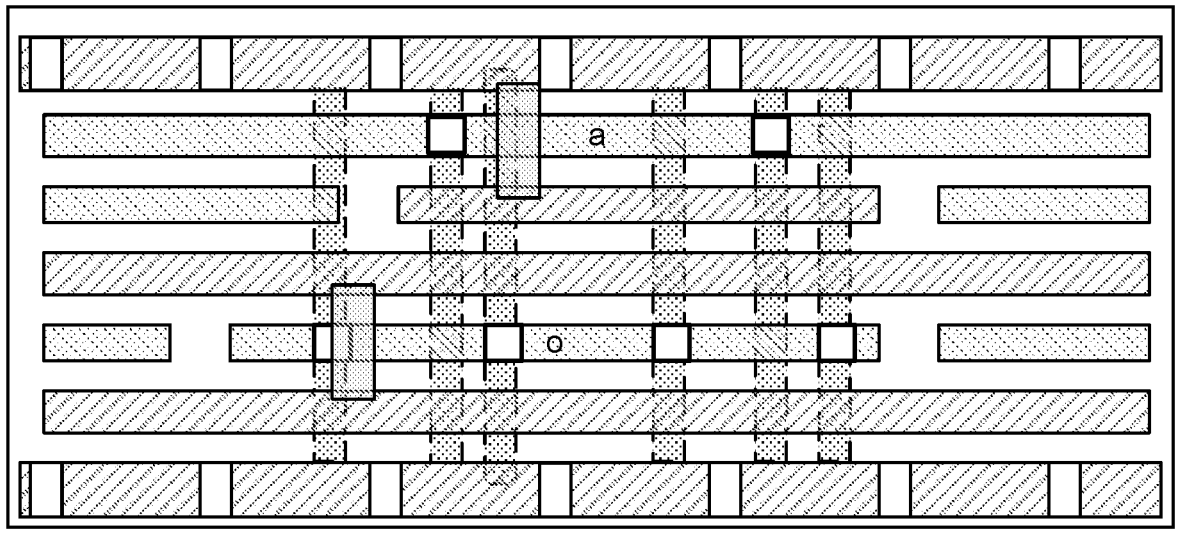
Figure 4H:
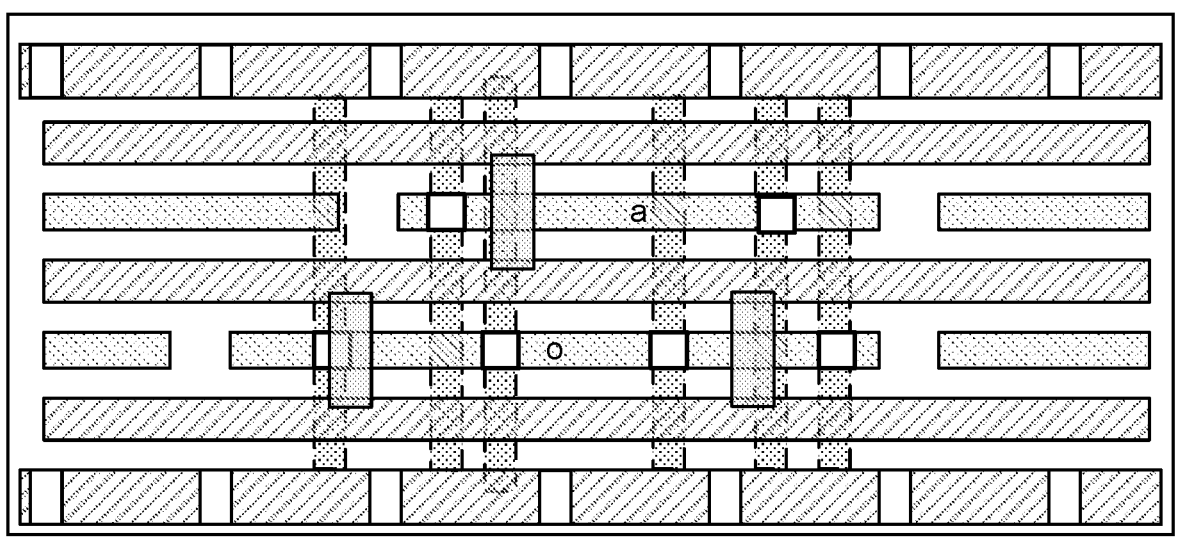

FIG. 4A shows cell variant 1 that uses one input via and one output via, as in previous technology nodes. FIG. 4B shows cell variant 2 that uses two input vias and two output vias. FIG. 4C shows cell variant 4 that uses two input vias and two spaced apart output vias. FIG. 4D shows cell variant 4 that uses one input via and four output vias. FIG. 4E shows cell variant 5 that uses two input vias and four output vias as the reference, but changes the location of the M3 interconnect line on the output net. FIG. 4F shows cell variant 6 that uses two input vias and four output vias as the reference, but changes the location of the output net to an adjacent M2 interconnect line. FIG. 4G shows cell variant 7 that uses two input vias and four output vias as the reference, but changes the location of the input net to an adjacent M2 interconnect line. FIG. 4H shows cell variant 8 that uses two input vias and four output vias as the reference, but includes an additional M3 interconnect line on the output net.

Table 1 shows the cell performance results between the pin must-connects reference cell 100 and the variant cells 1-8, where variant data values are normalized to the reference data. Table 1 shows the maximum delay of input pin (a) falling and output pin (o) rising, and for pin (o) falling and input pin (a) rising, both for comparable load and slope points, and the % change representing the difference in performance.

TABLE 1

| ARC | Ref | Var 1 | Var 2 | Var 3 | Var 4 | Var 5 | Var 6 | Var 7 | Var 8 |
|---|---|---|---|---|---|---|---|---|---|
| a_fall o_rise | 1 | 1.05850 | 1.01028 | 1.0108 | 1.02262 | 0.99949 | 1.00103 | 1.00103 | 0.98663 |
| o_fall a_rise | 1 | 1.08759 | 1.01586 | 1.01655 | 1.0331 | 0.99931 | 1.00138 | 1.00138 | 0.7869 |
| Avg. | 1 | 1.07067 | 1.01237 | 1.01296 | 1.02709 | 0.99941 | 1.00118 | 1.00118 | 0.98292 |

Table 1 shows that the largest % change in performance is between reference cell 100 and the variant 1, which only has one input via and 1 output via per previous technology nodes. Table 1 shows that the difference between the max delay of "input pin (a) falling and output pin (o) rising", and "pin (o) falling and output pin (a) rising" for the reference cell 100 and variant 1 is −5.85% and −8.76%, respectively. The average difference of −7.07% is significant considering that a transition from one technology node to another typically results in a scaling trend of approximately 10%.

Table 1 demonstrates that for a large cell like reference cell 100 that has more than two M1 interconnect lines comprising a pin, maximum performance may be achieved by matching the number of vias to the number of M1 interconnect lines comprising the pin. If a pin comprises n M1 interconnect lines, then maximum performance may be obtained by dropping n vias for the pin at the block level. According to the present embodiments, even if all n M1 interconnect lines comprising a pin are not connected with a corresponding via, any number of vias more than two will result in an increase of performance for large cells. Merely moving locations of M3 interconnect lines as in variant 5 appears to have insignificant effects.

The pin must-connects of the embodiments disclosed herein provide improved performance within the same technology node based on how the pins of a cell are connected at the block level, and increased redundancies for process. The implications of requiring additional vias at the block level means that the cell timing also has to match to block timing expectations. Therefore, in one embodiment cell layouts, which define a physical representation of the cells in a cell library, are characterized so that cell timing matches the block timing expectations. The router also has to be improved to mimic or achieve the multiple connections required at the block level.

In terms of an electronic design automation (EDA) flow, a method of fabricating a layout for an integrated circuit structure having pin must-connects of the disclosed embodiments may be implemented as follows. The process may begin by designing cells to be included in a standard cell library, wherein at least a portion of the cells has a pin must-connects level specifying that each instance of the cells have a pin comprising multiple interconnect lines include more than two vias on a single net corresponding to the pin. The cells are then characterized for physical implementation using a target technology node. The standard cell library is then accessed by a router during placement and routing functions to place and route physical implementations of the cells. Block level routing is then performed on the physical implementation of the cells.

The standard cell library may include multiple cell types. The cells of the standard cell library typically each comprise a relatively small number of transistors that define low-level logic functions such as NAND, AND, NOR, OR, flip-flops, latches and buffers. Entries in the standard cell library for the cells may include, but are not limited to, cell layout data, functional definitions, and delay information. In one embodiment, cell layouts in the standard cell library stop at predefined metal level.

In one embodiment, the entries in standard cell library for each cell further include, characterization data in the form of parameters from which the router may calculate timing delay for the corresponding cell after placement and routing. In previous technology nodes, the cell characterization data may include parameters such as one supply voltage and one process corner per cell type.

According to the present disclosure in which one via or multiple vias may be dropped on a cell depending on number of interconnect lines comprising a pin, cell delay may change based on whether a single via connection or multiple via connections are made. Accordingly, cell characterization and router tools must be improved to handle this variation. That is, the way cell is characterized and how the router handles the cell characterization data requires robust handshaking.

In a further aspect of the disclosed embodiments, enhanced cell characterization data is provided in a cell library defining the pin must-connects cell. In one embodiment, the enhanced cell characterization data requires for at least a portion of the cells in the cell library, a set of timing delays that are calculated using different combinations of parameter values such as supply voltages and process corners, as shown in FIG. 5.

Figure 5:
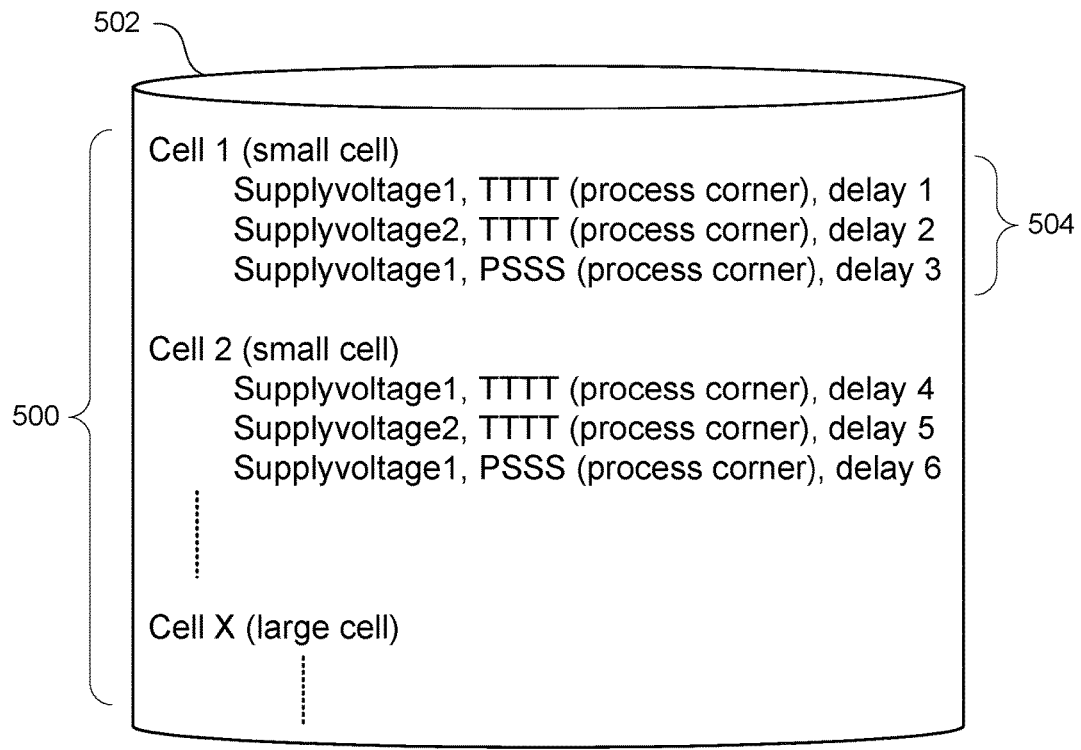
FIG. 5 is a diagram illustrating enhanced cell characterization data for example entries in a standard cell library developed to implement the pin must-connects.

FIG. 5 is a diagram illustrating enhanced cell characterization data for example entries 500 in a standard cell library 502 developed to implement the pin must-connects. The cell library 500 may be stored in any tangible medium, such as a computer memory. The cell library 500 includes a plurality entries for different sized cells labeled cell 1 to cell X. The cell library 500 also includes cell layouts (see FIG. 6) defining the cells available for use in physical implementations using a particular technology node and specifies characteristics of those cells. Each entry includes characterization data 504, which may include different combinations of parameter values such as supply voltages 1 and 2, process corners TTTT and PSSS, in order to provide different timing delays 1, 2 and 3 based on cell implementations in which a single via connection or multiple via connections are made. The same is shown for and cell 2 to provide delays 4, 5 and 6.

Figure 6:
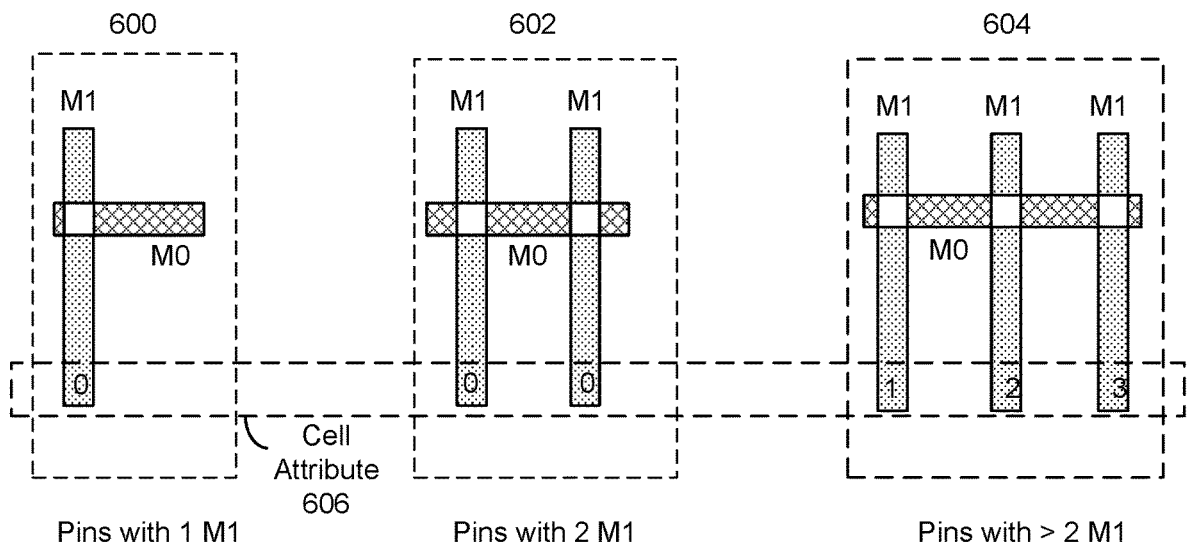
FIG. 6 illustrates improved cell configuration layouts to implement pin must-connects cells.

FIG. 6 illustrates improved cell configuration layouts to implement pin must-connects cells. In one embodiment, at least three cell configuration layouts are designed for each type of pin must-connects cell. Configuration layout 600 corresponds to the cell having a pin comprising one M1 interconnect line. Configuration layout 602 corresponds to the cell having a pin comprising two M1 interconnect lines. And configuration layout 604 corresponds to the cell having a pin comprising greater than two M1. In one embodiment, the cell layouts in the standard cell library include M0 and stop at M1. The squares at M0/M1 intersections represent vias.

In one embodiment, the cell design and the cell characterization data are configured to instruct a router to add a single point via connection to cells having a pin comprising less than or equal to two interconnect lines (i.e., either one or two interconnect lines), and to add multiple via connection points for large cells having a pin comprising more than two interconnect lines. The rationale for this is that when block level connections are made for small cells 600 and 602, the delay difference between the types of cells is insignificant, and only when block level connections are performed for large cells 604 are larger delay variations observed. Consequently, for small cells in the standard cell library, the cell characterization data is configured to instruct the router to perform single via point connections so as not to force the router to perform unnecessary multiple via connections. For large cells in the standard cell library, the cell characterization data is configured to instruct the router to enforce the pin must-connects concept, whereby a via connection is made to each of the M1 interconnect lines comprising the pin.

In one embodiment, the number of M1 interconnect lines comprising a pin are stored as cell attributes 606 or properties in the physical view of the cells in the standard cell library. These cell attributes 606 are subsequently accessed by the router during the placement and routing process. In one embodiment, cell attribute values greater than 0 (i.e., "1", "2", "3" and so on) for a particular M1 interconnect line comprising a pin indicates to the router that a via must be placed on that interconnect line. For cell 604, for example, the router will drop a via on all three M1 interconnect lines. A cell attribute value of zero indicates to the router that a single point via connection should be made to the corresponding M1 interconnect line comprising the pin, as shown for cells 600 and 602. According to one embodiment, the cell attributes 606 enable a handshake between the physical view of the cells and the router.

Figure 7A:
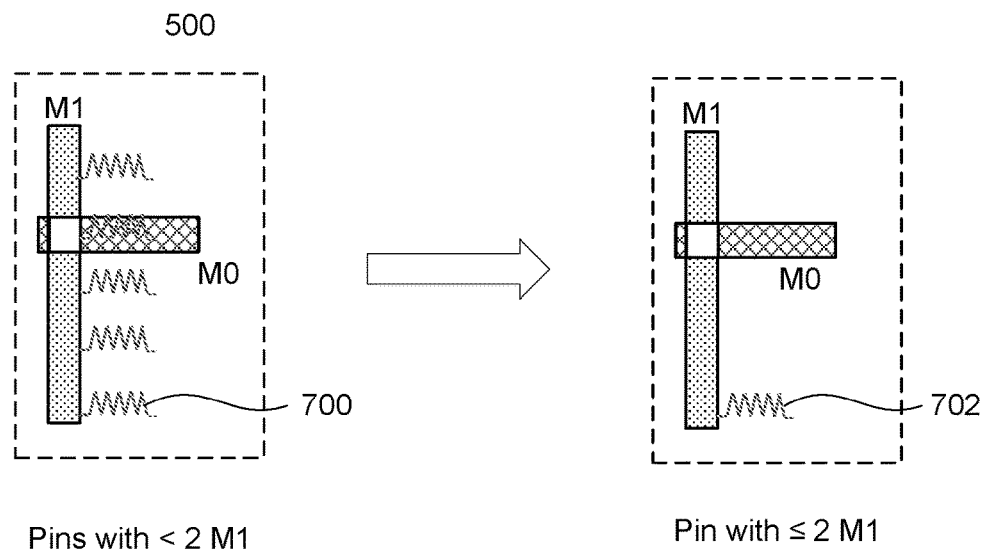
FIG. 7A illustrates possible probe points for a cell having a pin with less than or equal to two M1 interconnect lines.
Figure 7B:
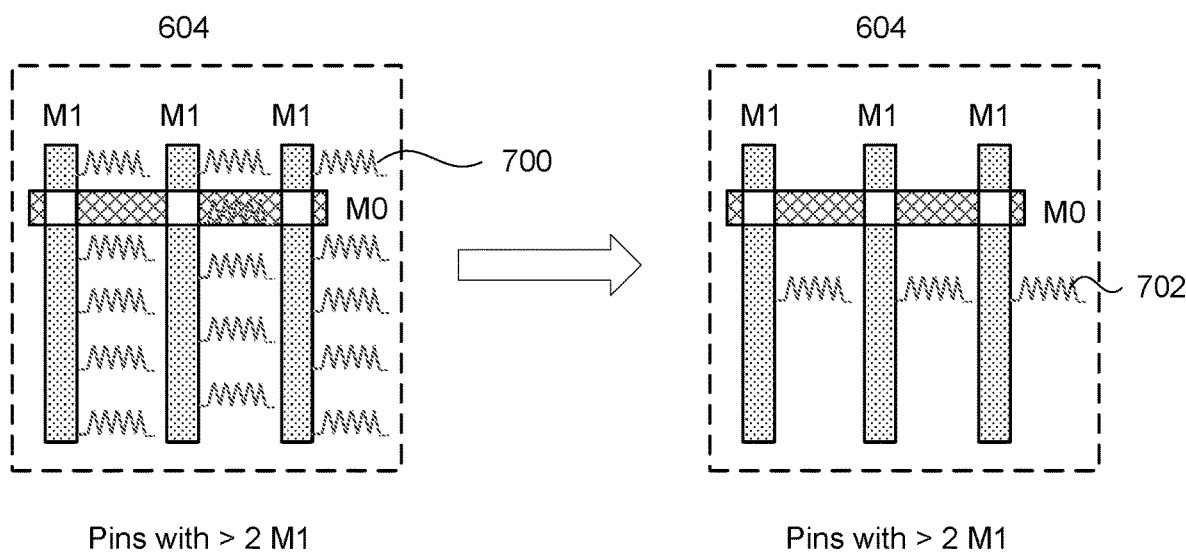
FIG. 7B illustrates possible probe points for a cell having a pin with more than two M1 interconnect lines.

In a further embodiment, the cell characterization process is further improved based on how locations of via connections points on a M1 interconnect line are determined, as shown in FIGS. 7A and 7B.

FIG. 7A illustrates possible probe points for a cell having a pin with less than or equal to two M1 interconnect lines. Although a pin M1 interconnect line may have multiple possible via locations 700 where the probe can exist (as shown on the left side of FIG. 7A), the cell is characterized assuming that there is only a single probe point 702 on each of the M1 interconnect lines (right side), where the probe point 702 corresponds to a single via drop location. In one embodiment, one worst case RC point in the pin cut probe points is selected, and a single point via connection is made based on the worst case RC point. In one embodiment, the worst case RC point is expected to be on the M1 interconnect line because of the presence of a via 0 between M1 and M0.

FIG. 7B illustrates possible probe points for a cell having a pin with more than two M1 interconnect lines. In one embodiment, a pin having multiple M1 interconnect lines is enabled to have multiple possible via locations 700 where on each of the M1 interconnect lines (left side), and the cell is characterized such that there is only a single probe point 702 on each of the M1 interconnect lines comprising the pin (right side).

Figure 8:
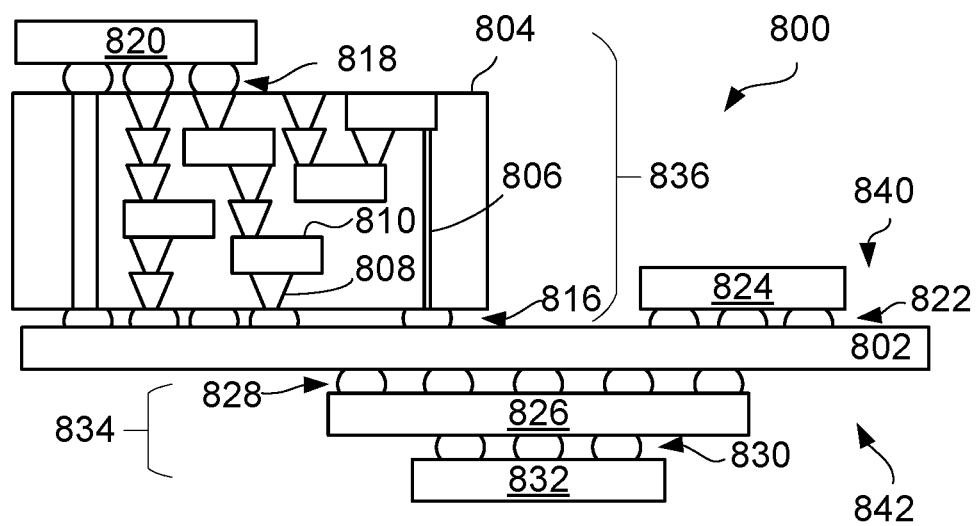
FIG. 8 is a cross-sectional side view of an integrated circuit (IC) device assembly that may include one or more cells with pin must-connects, in accordance with one or more of the embodiments disclosed herein.

FIG. 8 is a cross-sectional side view of an integrated circuit (IC) device assembly that may include one or more cells with pin must-connects, in accordance with one or more of the embodiments disclosed herein.

Referring to FIG. 8, an IC device assembly 800 includes components having one or more integrated circuit structures described herein. The IC device assembly 800 includes a number of components disposed on a circuit board 802 (which may be, e.g., a motherboard). The IC device assembly 800 includes components disposed on a first face 840 of the circuit board 802 and an opposing second face 842 of the circuit board 802. Generally, components may be disposed on one or both faces 840 and 842. In particular, any suitable ones of the components of the IC device assembly 800 may include a number of cells with pin must-connects, such as disclosed herein.

In some embodiments, the circuit board 802 may be a printed circuit board (PCB) including multiple metal layers separated from one another by layers of dielectric material and interconnected by electrically conductive vias. Any one or more of the metal layers may be formed in a desired circuit pattern to route electrical signals (optionally in conjunction with other metal layers) between the components coupled to the circuit board 802. In other embodiments, the circuit board 802 may be a non-PCB substrate.

The IC device assembly 800 illustrated in FIG. 8 includes a package-on-interposer structure 836 coupled to the first face 840 of the circuit board 802 by coupling components 816. The coupling components 816 may electrically and mechanically couple the package-on-interposer structure 836 to the circuit board 802, and may include solder balls (as shown in FIG. 8), male and female portions of a socket, an adhesive, an underfill material, and/or any other suitable electrical and/or mechanical coupling structure.

The package-on-interposer structure 836 may include an IC package 820 coupled to an interposer 804 by coupling components 818. The coupling components 818 may take any suitable form for the application, such as the forms discussed above with reference to the coupling components 816. Although a single IC package 820 is shown in FIG. 8, multiple IC packages may be coupled to the interposer 804. It is to be appreciated that additional interposers may be coupled to the interposer 804. The interposer 804 may provide an intervening substrate used to bridge the circuit board 802 and the IC package 820. The IC package 820 may be or include, for example, a die (the die 702 of FIG. 7B), or any other suitable component. Generally, the interposer 804 may spread a connection to a wider pitch or reroute a connection to a different connection. For example, the interposer 804 may couple the IC package 820 (e.g., a die) to a ball grid array (BGA) of the coupling components 816 for coupling to the circuit board 802. In the embodiment illustrated in FIG. 8, the IC package 820 and the circuit board 802 are attached to opposing sides of the interposer 804. In other embodiments, the IC package 820 and the circuit board 802 may be attached to a same side of the interposer 804. In some embodiments, three or more components may be interconnected by way of the interposer 804.

The interposer 804 may be formed of an epoxy resin, a fiberglass-reinforced epoxy resin, a ceramic material, or a polymer material such as polyimide. In some implementations, the interposer 804 may be formed of alternate rigid or flexible materials that may include the same materials described above for use in a semiconductor substrate, such as silicon, germanium, and other group III-V and group IV materials. The interposer 804 may include metal interconnects 810 and vias 808, including but not limited to through-silicon vias (TSVs) 806. The interposer 804 may further include embedded devices 814, including both passive and active devices. Such devices may include, but are not limited to, capacitors, decoupling capacitors, resistors, inductors, fuses, diodes, transformers, sensors, electrostatic discharge (ESD) devices, and memory devices. More complex devices such as radio-frequency (RF) devices, power amplifiers, power management devices, antennas, arrays, sensors, and microelectromechanical systems (MEMS) devices may also be formed on the interposer 804. The package-on-interposer structure 836 may take the form of any of the package-on-interposer structures known in the art.

The IC device assembly 800 may include an IC package 824 coupled to the first face 840 of the circuit board 802 by coupling components 822. The coupling components 822 may take the form of any of the embodiments discussed above with reference to the coupling components 816, and the IC package 824 may take the form of any of the embodiments discussed above with reference to the IC package 820.

The IC device assembly 800 illustrated in FIG. 8 includes a package-on-package structure 834 coupled to the second face 842 of the circuit board 802 by coupling components 828. The package-on-package structure 834 may include an IC package 826 and an IC package 832 coupled together by coupling components 830 such that the IC package 826 is disposed between the circuit board 802 and the IC package 832. The coupling components 828 and 830 may take the form of any of the embodiments of the coupling components 816 discussed above, and the IC packages 826 and 832 may take the form of any of the embodiments of the IC package 820 discussed above. The package-on-package structure 834 may be configured in accordance with any of the package-on-package structures known in the art.

Figure 9:
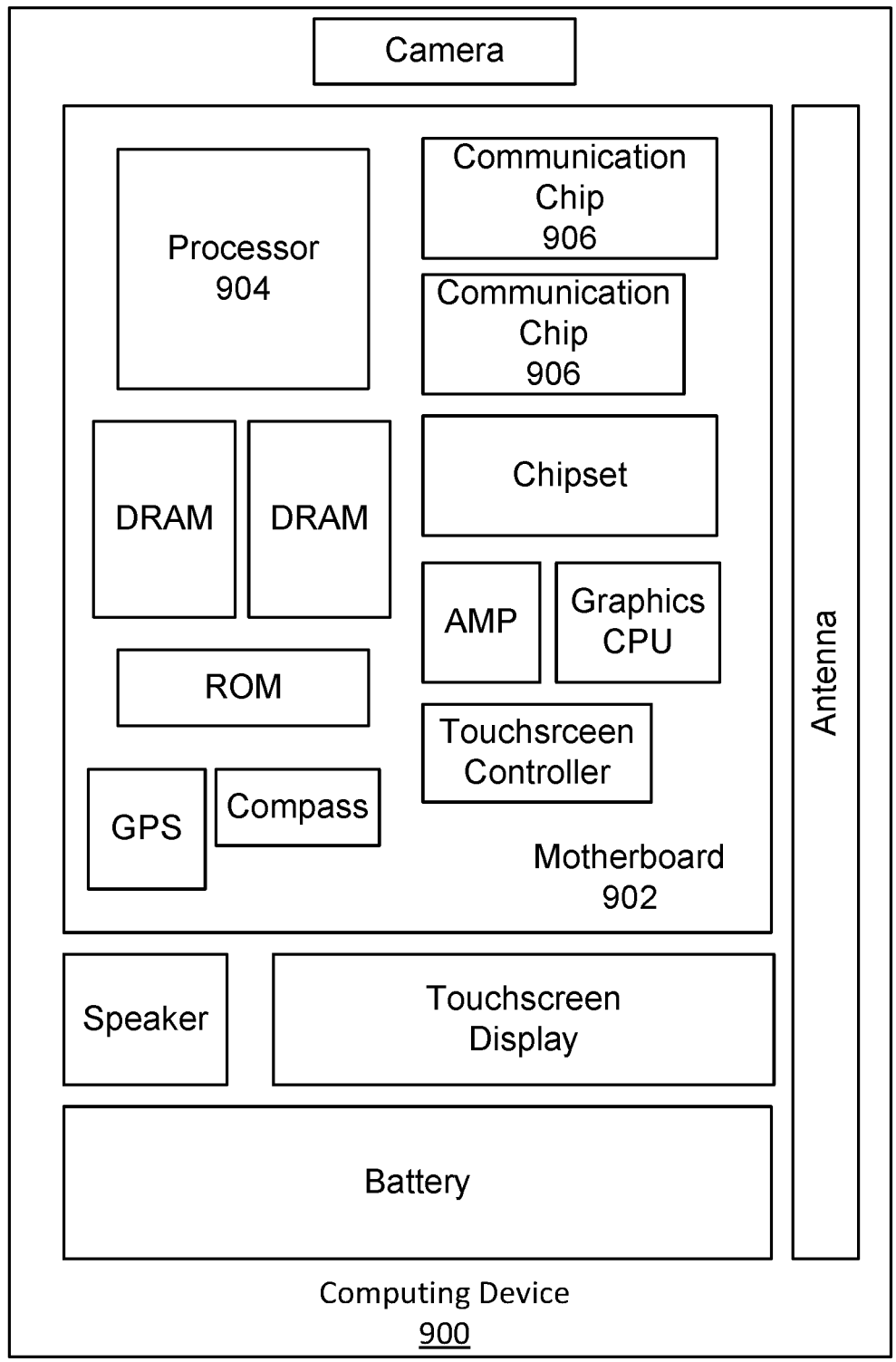
FIG. 9 illustrates a computing device in accordance with one implementation of the disclosure.

FIG. 9 illustrates a computing device 900 in accordance with one implementation of the disclosure. The computing device 900 houses a board 902. The board 902 may include a number of components, including but not limited to a processor 904 and at least one communication chip 906. The processor 904 is physically and electrically coupled to the board 902. In some implementations the at least one communication chip 906 is also physically and electrically coupled to the board 902. In further implementations, the communication chip 906 is part of the processor 904.

Depending on its applications, computing device 900 may include other components that may or may not be physically and electrically coupled to the board 902. These other components include, but are not limited to, volatile memory (e.g., DRAM), non-volatile memory (e.g., ROM), flash memory, a graphics processor, a digital signal processor, a crypto processor, a chipset, an antenna, a display, a touchscreen display, a touchscreen controller, a battery, an audio codec, a video codec, a power amplifier, a global positioning system (GPS) device, a compass, an accelerometer, a gyroscope, a speaker, a camera, and a mass storage device (such as hard disk drive, compact disk (CD), digital versatile disk (DVD), and so forth).

The communication chip 906 enables wireless communications for the transfer of data to and from the computing device 900. The term "wireless" and its derivatives may be used to describe circuits, devices, systems, methods, techniques, communications channels, etc., that may communicate data through the use of modulated electromagnetic radiation through a non-solid medium. The term does not imply that the associated devices do not contain any wires, although in some embodiments they might not. The communication chip 906 may implement any of a number of wireless standards or protocols, including but not limited to Wi-Fi (IEEE 802.11 family), WiMAX (IEEE 802.16 family), IEEE 802.20, long term evolution (LTE), Ev-DO, HSPA+, HSDPA+, HSUPA+, EDGE, GSM, GPRS, CDMA, TDMA, DECT, Bluetooth, derivatives thereof, as well as any other wireless protocols that are designated as 3G, 4G, 5G, and beyond. The computing device 900 may include a plurality of communication chips 906. For instance, a first communication chip 906 may be dedicated to shorter range wireless communications such as Wi-Fi and Bluetooth and a second communication chip 906 may be dedicated to longer range wireless communications such as GPS, EDGE, GPRS, CDMA, WiMAX, LTE, Ev-DO, and others.

The processor 904 of the computing device 900 includes an integrated circuit die packaged within the processor 904. In some implementations of the disclosure, the integrated circuit die of the processor includes one or more cells with pin must-connects, in accordance with implementations of embodiments of the disclosure. The term "processor" may refer to any device or portion of a device that processes electronic data from registers and/or memory to transform that electronic data into other electronic data that may be stored in registers and/or memory.

The communication chip 906 also includes an integrated circuit die packaged within the communication chip 906. In accordance with another implementation of embodiments of the disclosure, the integrated circuit die of the communication chip includes one or more cells with pin must-connects, in accordance with implementations of embodiments of the disclosure.

In further implementations, another component housed within the computing device 900 may contain an integrated circuit die that includes one or more cells with pin must-connects, in accordance with implementations of embodiments of the disclosure.

In various implementations, the computing device 900 may be a laptop, a netbook, a notebook, an ultrabook, a smartphone, a tablet, a personal digital assistant (PDA), an ultra mobile PC, a mobile phone, a desktop computer, a server, a printer, a scanner, a monitor, a set-top box, an entertainment control unit, a digital camera, a portable music player, or a digital video recorder. In further implementations, the computing device 900 may be any other electronic device that processes data.

Thus, embodiments described herein include pin must-connects. The above description of illustrated implementations of embodiments of the disclosure, including what is described in the Abstract, is not intended to be exhaustive or to limit the disclosure to the precise forms disclosed. While specific implementations of, and examples for, the disclosure are described herein for illustrative purposes, various equivalent modifications are possible within the scope of the disclosure, as those skilled in the relevant art will recognize.

These modifications may be made to the disclosure in light of the above detailed description. The terms used in the following claims should not be construed to limit the disclosure to the specific implementations disclosed in the specification and the claims. Rather, the scope of the disclosure is to be determined entirely by the following claims, which are to be construed in accordance with established doctrines of claim interpretation.

Example embodiment 1: An integrated circuit structure includes a first metal level comprising a first plurality of interconnect lines along a first direction. A cell is on at least the first metal level, the cell having a pin comprising more than two of the first plurality of interconnect lines. A second metal level comprising a second plurality of interconnect lines overlays the first metal level, where the second plurality of interconnect lines is along a second direction. Two or more vias are on at least one of the second plurality of interconnect lines to connect to the pin.

Example embodiment 2: The integrated circuit structure of example embodiment 1, wherein the at least one of the second plurality of interconnect lines comprises a single net that spans across the two or more of the first plurality of interconnect lines comprising the pin.

Example embodiment 3: The integrated circuit structure of embodiment 1 or 2, wherein a number of vias on the single net is maximized to match a number of the first plurality of interconnect lines comprising the pin.

Example embodiment 4: The integrated circuit structure of embodiment 1, 2 or 3, wherein the pin comprises n of the first plurality of interconnect lines, and n of the vias are on the single net.

Example embodiment 5: The integrated circuit structure of embodiment 1, wherein the cell comprises at least two pins, the cell comprising a single point via connection for any of the at least two pins comprising less than or equal to two of the first plurality of interconnect lines, and multiple via connection points for any of the at least two pins comprising more than two of the first plurality of interconnect lines.

Example embodiment 6: The integrated circuit structure of embodiment 1 or 5, wherein a number of the first plurality of interconnect lines comprising the pin is stored as a cell attribute in a cell library.

Example embodiment 7: The integrated circuit structure of embodiment 1, wherein the second direction of the second plurality of interconnect lines is orthogonal to the first direction of the first plurality of interconnect lines.

Example embodiment 8: The integrated circuit structure of embodiment 1, further comprising a third metal level interconnect line along the first direction of over the second metal level to connect the single net to adjacent one of the second plurality of interconnect lines.

Example embodiment 9: The integrated circuit structure of embodiment 1, wherein individual ones of the first plurality of interconnect lines comprising the pin include multiple possible via locations, and wherein the cell is characterized such that there is only a single probe point on the individual ones of the of the first plurality of the interconnect lines comprising the pin.

Example embodiment 10: An integrated circuit structure includes a first metal level comprising an input pin and an output pin, wherein the input pin comprises a first set of more than two interconnect lines, and the output pin comprises a second set of more than two interconnect lines. A second metal level overlaying the first metal level, the second metal level comprising an input net that spans across the first set of the more than two interconnect lines comprising the input pin, and an output net that spans across the second set of the more than two interconnect lines comprising the output pin. A first set of two or more vias is on the input net to connect to the input pin, and a second set of two or more vias is on the output net to connect to the output pin.

Example embodiment 11: The integrated circuit structure of embodiment 10, wherein a number of vias in the first set of two or more vias on the input net is maximized to match a number of the first set of more than two of the interconnect lines comprising the pin, and wherein a number of vias in the second set of two or more vias on the output net is maximized to match a number of the second set of more than two of the interconnect lines comprising the output pin.

Example embodiment 12: The integrated circuit structure of embodiment 10 or 11, wherein the cell comprises a third pin comprising a third set of two or less interconnect lines, the cell further comprising a single point via connection for the third pin.

Example embodiment 13: The integrated circuit structure of embodiment 12, wherein a number of the interconnect lines comprising first pin, the second pin, and the third pin are stored as a respective cell attribute in a cell library.

Example embodiment 14: The integrated circuit structure of embodiment 10, 11, 12, or 13, wherein the first metal level includes a first plurality of interconnect lines along a first direction, and the second metal level includes a second plurality of interconnect lines along a second direction orthogonal to the first direction.

Example embodiment 15: The integrated circuit structure of embodiment 10, 11, 12, 13, or 14, further comprising a third metal level comprising a third plurality of interconnect lines along the first direction of over the second metal level to connect the input net and the output to adjacent one of the second plurality of interconnect lines.

Example embodiment 16: A cell library stored on a tangible medium, the cell library comprises a plurality of cell layouts defining individual cells available for use in physical implementations using a particular technology node. A first layout corresponds to individual ones of the cells having a pin comprising one interconnect line, a second layout corresponds to individual ones of the cells having a pin comprising two interconnect lines, and third configuration layout corresponds to individual ones of the cells having a pin comprising greater than two interconnect lines. Characterization data for individual ones of the cells includes different combinations of parameter values such as supply voltages and process corners, in order to provide different timing delays based on cell implementations in which a single via connection or multiple via connections are made to the pin.

Example embodiment 17: The cell library of embodiment 16, wherein the characterization instructs a router to add a single point via connection to the cells having a pin comprising less than or equal to two interconnect lines, and to add multiple via connections for the cells having a pin comprising more than two interconnect lines.

Example embodiment 18: The cell library of embodiment 16 or 17, wherein a number of the interconnect lines comprising the pins are stored as a respective cell attribute in a cell library.

Example embodiment 19: A method of fabricating a layout for an integrated circuit structure includes designing cells to be included in a standard cell library, wherein at least a portion of the cells have a pin must-connects level specifying that each instance of the cells having a pin comprising multiple interconnect lines include more than two vias on a single net corresponding to the pin. The cells are characterized for implementation using a target technology node. The cell library is accessed during placement and routing functions to place and route physical implementations of the cells. Block level routing is performed on the physical implementations of the cells.

Example embodiment 20: The method of embodiment 19, further comprising including multiple cell types in the cell library.

Example embodiment 21: The method of embodiment 19 or 20, further comprising providing entries in the cell library for the at least a portion of the cells that include cell layout data and characterization data, wherein the characterization data requires a set of timing delays that are calculated using different combinations of parameter values including supply voltages and process corners.

Example embodiment 22: The method of embodiment 19, 20, or 21, further comprising providing individual ones of the cells with at least three cell layouts comprising a first layout for a pin comprising one interconnect line, a second layout for a pin comprising two interconnect lines, and a third layout for a pin comprising more than two interconnect lines.

Example embodiment 23: The method of embodiment 21 or 22, further comprising configuring cell characterization data to: instruct a router to add a single point via connection to cells having a pin comprising less than or equal to two of the first plurality of interconnect lines, and to instruct the router to add multiple via connection points to the cells having a pin comprising more than two of the first part of interconnect lines.

Example embodiment 24: The method of embodiment 23, further comprising storing a number of first plurality of interconnect lines comprising a particular pin as a cell attribute in the cell library.

Example embodiment 25: The method of embodiment 23 or 24, further comprising for the at least a portion of the cells have a pin comprising multiple ones of the first plurality of interconnect lines, enabling multiple possible via locations on individual ones of the first plurality of interconnect lines comprising the pin, and characterizing at least a portion of the cells such that there is only a single probe point on each of the multiple ones of the first plurality of interconnect lines comprising the pin.

What is claimed is:

1. An integrated circuit structure, comprising:
    a first metal level comprising a first plurality of interconnect lines along a first direction;
    a cell on at least the first metal level, the cell having a pin comprising more than two of the first plurality of interconnect lines;
    a second metal level comprising a second plurality of interconnect lines overlaying the first metal level, the second plurality of interconnect lines along a second direction, wherein at least one of the second plurality of interconnect lines comprises a single net that spans across the two or more of the first plurality of interconnect lines comprising the pin; and
    a number of vias greater than two on the at least one of the second plurality of interconnect lines to connect to the pin, wherein the number of vias on the single net is maximized to match a number of the first plurality of interconnect lines comprising the pin such that when the pin comprises n of the first plurality of interconnect lines, n of the vias are on the single net.

2. The integrated circuit structure of claim 1, wherein the cell comprises at least two pins, the cell comprising a single point via connection for any of the at least two pins comprising less than or equal to two of the first plurality of interconnect lines, and multiple via connection points for any of the at least two pins comprising more than two of the first plurality of interconnect lines.

3. The integrated circuit structure of claim 1, wherein a number of the first plurality of interconnect lines comprising the pin is stored as a cell attribute in a cell library.

4. The integrated circuit structure of claim 1, wherein the second direction of the second plurality of interconnect lines is orthogonal to the first direction of the first plurality of interconnect lines.

5. The integrated circuit structure of claim 1, further comprising a third metal level interconnect line along the first direction of over the second metal level to connect the single net to adjacent one of the second plurality of interconnect lines.

6. The integrated circuit structure of claim 1, wherein individual ones of the first plurality of interconnect lines comprising the pin include multiple possible via locations, and wherein the cell is characterized such that there is only a single probe point on the individual ones of the first plurality of the interconnect lines comprising the pin.

7. An integrated circuit structure, comprising:
a first metal level comprising an input pin and an output pin, wherein the input pin comprises a first set of more than two interconnect lines, and the output pin comprises a second set of more than two interconnect lines;
a second metal level overlaying the first metal level, the second metal level comprising an input net that spans across the first set of the more than two interconnect lines comprising the input pin, and an output net that spans across the second set of the more than two interconnect lines comprising the output pin;
a first set of more than two vias on the input net to connect to the input pin; and
a second set of more than two vias on the output net to connect to the output pin, wherein a number of vias in the first set of two or more vias on the input net is maximized to match a number of the first set of more than two of the interconnect lines comprising the pin, and wherein a number of vias in the second set of two or more vias on the output net is maximized to match a number of the second set of more than two of the interconnect lines comprising the output pin.

8. The integrated circuit structure of claim 7, wherein the cell comprises a third pin comprising a third set of two or less interconnect lines, the cell further comprising a single point via connection for the third pin.

9. The integrated circuit structure of claim 8, wherein a number of the interconnect lines comprising first pin, the second pin, and the third pin are stored as a respective cell attribute in a cell library.

10. The integrated circuit structure of claim 7, wherein the first metal level includes a first plurality of interconnect lines along a first direction, and the second metal level includes a second plurality of interconnect lines along a second direction orthogonal to the first direction.

11. The integrated circuit structure of claim 7, further comprising a third metal level comprising a third plurality of interconnect lines along the first direction of over the second metal level to connect the input net and the output to adjacent one of the second plurality of interconnect lines.

* * * * *